United States Patent [19]

Naono et al.

[11] Patent Number: 5,754,438
[45] Date of Patent: May 19, 1998

[54] FREQUENCY ANALYZING METHOD AND APPARATUS FOR TIME SERIES DATA

[75] Inventors: Ken Naono, Kokubunji; Nobutoshi Sagawa, Koganei, both of Japan

[73] Assignee: Hitachi, Ltd., Tokyo, Japan

[21] Appl. No.: 720,433

[22] Filed: Sep. 30, 1996

[30] Foreign Application Priority Data

Oct. 27, 1995 [JP] Japan .................................. 7-280146

[51] Int. Cl.$^6$ ...................................................... G06F 17/14
[52] U.S. Cl. ............................................. 364/485; 364/484
[58] Field of Search ................................. 364/485, 480, 364/484, 486, 487, 550, 133, 134, 725.01, 728.01, 826, 807; 324/76.12, 76.19, 76.21, 76.22, 76.39

[56] References Cited

U.S. PATENT DOCUMENTS 4,974,187  11/1990  Lawton ............................. 364/728.01
5,124,930   6/1992  Nicolas et al. ......................... 364/485
5,384,725   1/1995  Coifman et al. ........................ 364/807

OTHER PUBLICATIONS

"Feature articles: Wavelets", Mathematical Science, Dec. 1992.
Orthonormal Bases Compactly Supported Wavelets by Ingrid Daubechies vol. XLI909, 965, 980 1988.

*Primary Examiner*—James P. Trammell
*Assistant Examiner*—M. Kemper
*Attorney, Agent, or Firm*—Antonelli, Terry, Stout, & Kraus, LLP

[57] ABSTRACT

By using the wavelet method and the inverse Mallat transform of the wavelet theory, frequency analysis of large scale time series data is carried out at high speed while effectively utilizing the hardware of a parallel computer of distributed memory type. To be concrete, on the parallel computer of distributed memory type, data to be analyzed, a scaling function, and a Daubechies's progression are inputted to individual memories. Highest order frequency component parallel numerical integral operation is conducted to derive a frequency component of the highest order to be analyzed. Series low frequency component analyzing using the inverse Mallat transform is conducted to effect frequency analysis other than the highest frequency by using the inverse Mallat transform of the wavelet theory. Frequency data combining is conducted to put together frequencies derived by respective processors in an external memory.

6 Claims, 8 Drawing Sheets

|  | FOURIER TRANSFORM | PRESENT INVENTION |
|---|---|---|
| FREQUENCY ANALYSIS OF HIGHEST ORDER FREQUENCY | NUMERICAL INTEGRAL | NUMERICAL INTEGRAL |
| FREQUENCY ANALYSIS OTHER THAN HIGHEST ORDER | NUMERICAL INTEGRAL | INVERSE MALLAT TRANSFORM |

FREQUENCY ANALYZING METHOD AND APPARATUS FOR TIME SERIES DATA

BACKGROUND OF THE INVENTION

The present invention relates to a method and apparatus for conducting frequency analysis of large scale time series data in a computer having processors and parallel calculating mechanisms of distributed memory type associated with the processors. In particular, the present invention relates to a method and apparatus for carrying out the frequency analysis of large scale time series data at high speed in acoustic signal processing, picture image processing, and turbulence analysis, for example.

Herein, frequency analysis refers to deriving the magnitude of frequency components at each time.

Figure 1:
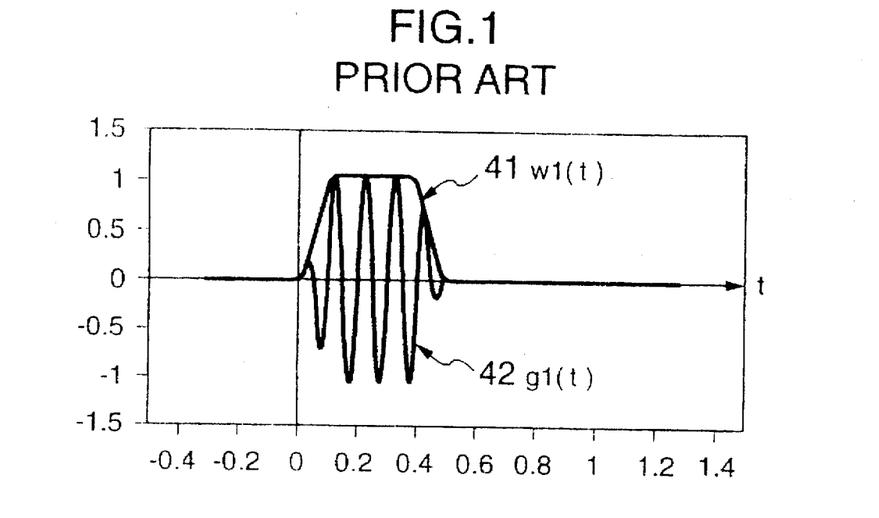
FIG. 1 is a diagram showing a window function w(t) and a base function g(t) which are analyzing means of a high frequency portion using Fourier transform which is a conventional technique.
Figure 2:
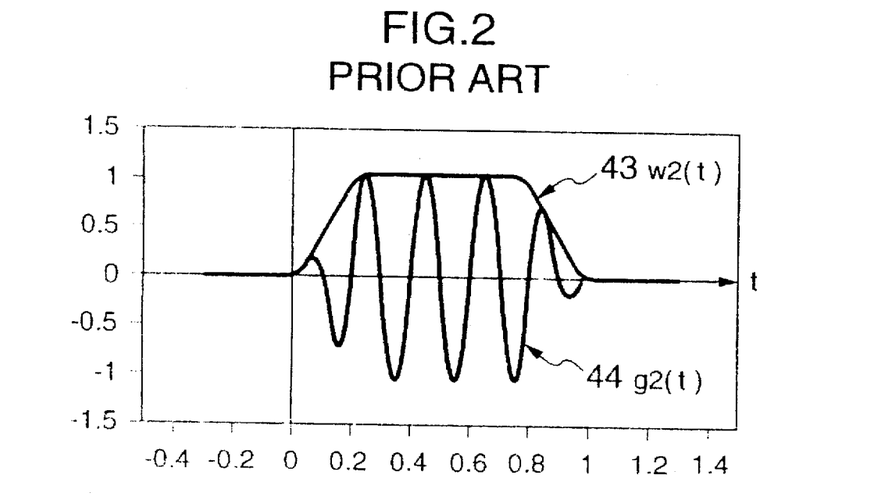
FIG. 2 is a diagram showing a window function w(t) and a base function g(t) which are analyzing means of a low frequency portion using Fourier transform which is a conventional technique.

Heretofore, Fourier transforms have been used for frequency analysis of time series data. It is known that conducting Fourier series expansion at a time over the entire time series data to be analyzed is not effective because of time axis uniformity of sin(t) and cos(t) (where t represents time) used as base functions. The actually used method includes the steps of dividing the time series data in the time axis, multiplying the time series data by window functions w1(t) and w2(t) having values in only certain local portions as represented by arrows 41 and 43 in FIGS. 1 and 2, and then conducting Fourier transforms locally. In other words, expansion was conducted by using base functions such as functions g1(t) and g2(t) shown in FIGS. 1 and 2. In the case where high frequency components were to be derived at this time, the window width of the window function was made small as shown in FIG. 1. In the case where low frequency components were to be derived, the window width of the window function was made large as shown in FIG. 2. As the scale of time series data was made larger, it was attempted to conduct Fourier transforms in computers each having parallel calculating mechanisms of distributed memory type for achieving high-speed execution.

As another method for frequency analysis of time series data, the wavelet method has been used. The wavelet method uses base functions called wavelets which are orthonormal not only in the frequency direction but also in the time axis direction unlike the Fourier transforms. The wavelet method has been used especially for frequency analysis of time series data having features in the time axis direction. (For details of the wavelet method, see "Feature articles: Wavelets," Mathematical Sciences, December 1992, and "Orthonormal Bases Compactly Supported Wavelets" by INGRID DAUBECHIES Vol. XLI 909, 965, 980 (1988).)

However, predominance of the wavelet method over the Fourier transforms in the amount of calculation, calculation time, or labor of program process was not found. Therefore, the range of use of the wavelet method was limited.

In the case where it is attempted to carry out frequency analysis of large scale time series data in a computer having parallel calculating mechanisms of distributed memory type in order to achieve high speed processing, it is possible to multiply data by window functions having small window widths and carry out numerical integrals for respective windows in parallel, even in the frequency transform for deriving high frequency components. However, the following three problems are posed in deriving low frequency components of large scale time series data in a computer having parallel calculating mechanisms of distributed memory type by using the Fourier transforms.

First, in the Fourier transforms, low frequency components must be derived by newly conducting numerical integrals without effectively using data obtained as a result of numerical integrals of higher frequency components. The reason will now be described. In the analysis of low frequency components, a section to be analyzed is defined by a window function having a large window width. The base function used therein bears no relation to the base function used in analysis of high frequency components. It thus becomes impossible to use the data obtained in the analysis of the high frequency components.

Secondly, in the Fourier transforms, large scale time series data are handled even for numerical integrals conducted at a time to derive low frequency components. Due to constraint of the memory capacity of the computer of distributed memory type, however, it is difficult to take the large scale time series data required at a time by one processor into the memory.

A third problem will now be described. If it is attempted to avoid the above described second problem in the range of the Fourier transforms, it becomes necessary to divide the large scale time series data into some processors. As a result, it becomes necessary to carry out complicated computations such as dividing the window function, the base function constituted therefrom, and the large scale time series data, transferring them to respective processors, conducting numerical integrals in respective processors, transferring their results to one processor, and adding together the results. This results in a complicated program in the computer having parallel calculating mechanisms of distributed memory type.

SUMMARY OF THE INVENTION

In accodance with the present invention, Daubechies's wavelets are used as base functions in the frequency analysis of large scale time series data in order to eliminate the above described problems. The Daubechies's wavelets are described in "Orthonormal Bases of Compactly Supported Wavelets," by I. Daubechies, Communucations on Pure and Applied Mathematics, 41, pp. 909–996 (1988). Especially, its numerical configuration method is expressed by equations (4.1), (4.2) and (4.3) in p. 965 and shown in Table 1 of p.980. The term "wavelets" means base functions wave(i,j,t) which are orthogonal in both the time direction i and the frequency direction j. By the base function, arbitrary time series data are resolved into components of power of 2 in both frequency and time. The base function is formed by a mother wavelet function motherwave(t) according to the following equation (1).

$$\text{wave}(i,j,t) = 2^{j/2} \text{motherwave}(2^j t - i) \tag{1}$$

By the wavelet, time series data represented by a quadratically integrable function f(t) are expanded as in equation (2).

$$f(t) = \sum_{j \in z} \sum_{i \in z} B(i,j) \text{wave}(i,j,t) \tag{2}$$

$$B(i,j) = \int_{-\infty}^{+\infty} f(t) \text{wave}(i,j,t) dt$$

The coefficient B(i,j) in the equation (2) represents the strength of a wave having a frequency equivalent to the j-th power of 2 at time equivalent to i/(the j-th power of 2). In the theory of the wavelet, there is a function called scaling function Scale(i,j,t). By using this, an expansion similar to the equation (3) is achieved by equation (4). In the equation (3), the frequency "j" of the expansion of the equation (2) is taken from minus infinity and truncated at a certain finite resolution m. A coefficient A(i,m) in the equation (4) becomes the sum total of the coefficients B(i,j) of the equation (3) with j ranging from minus infinity to m−1 and i taking a certain finite number of values.

$$f(t) = \sum_{j \geq m} \sum_{i \in z} B(i,j) \text{wave}(i,j,t) \quad (3)$$

$$f(t) = \sum_{j \geq m} A(i,m) \text{scale}(i,m,t) \quad (4)$$

$$A(i,j) = \int_{-\infty}^{+\infty} f(t) \text{scale}(i,j,t) dt$$

The scaling function Scale(i,j,t) is also formed from the mother scaling function motherscale(i,j,t) as expressed in equation (5).

$$\text{scale}(i,j,t) = 2^{j/2} \text{mother scale}(2^j t - i) \quad (5)$$

The mother scaling function motherscale(t), from which the Daubechies's scaling function Scale(i,m,t) is formed, is the solution of a function equation (6).

$$\text{mother scale}(t) = \sqrt{2} \sum_{k=0}^{2N-1} h(k) \text{mother scale}(2t - k) \quad (6)$$

The progression formed by 2N (where N is a natural number of at least 1) components (h(0), h(1), ..., h(2N−1)) as expressed in equation (6) is referred to as Daubechies's progression (h(0), h(1), ..., h(2N−1)). The progressions with N ranging from 1 to 10 are listed in Table 1 of page 980 of the above described paper written by Daubechies. Hereafter, a scaling function formed by such a progression having 2N components is referred to as scaling function of structure order N.

Furthermore, in the theory of wavelets, inverse Mallat transforms are included. By the inverse Mallat transform, expansion using the scaling function at a resolution "j" is resolved into the sum of expansion using a scaling function at a resolution "j−1" and expansion using a wavelet function at a resolution "j−1" as expressed in equation (7).

$$\sum_{i \in z} A(i,j) \text{scale}(i,j,t) = \sum_{i \in z} A(i,j-1) \text{scale}(i,j-1,t) + \quad (7)$$

$$\sum_{i \in z} B(i,j-1) \text{wave}(i,j-1,t)$$

The inverse Mallat transform is implemented by equations including only expansion coefficients as represented by equations (8) and (9).

$$A(i,j) = \sum_{k=0}^{2N-1} h(k) A(2i + k, j+1) \quad (8)$$

$$B(i,j) = \sum_{k=0}^{2N-1} (-1)^{k+1} h(k) A(2i - k + 1, j+1) \quad (9)$$

A frequency analyzing method of large scale time series data using these wavelet techniques according to the present invention is formed by the following four kinds of processing:

(1) input processing for inputting a scaling function Scale(i,m,t) in the wavelet theory having a greatest resolution "j=m" among scaling functions in use and time series data to be analyzed which are divided so as to have a support width equivalent to that of the scaling function;

(2) parallel numerical integral processing of highest order frequency component for deriving a highest frequency component A(i,m) to be derived by conducting numerical integrals in respective processors in parallel with the inputted scaling function;

(3) series low frequency component analyzing processing using the inverse Mallat transform for deriving, from a plurality of frequency components having a high order resolution, a frequency component having a resolution of next order by using the inverse Mallat transform of the wavelet theory; and (4) frequency data combining processing for transferring frequency components obtained in respective processors to one processor and displaying them.

In the above described series low frequency component analyzing processing using the inverse Mallat transform, frequency component analysis for frequency components other than the highest frequency component is implemented by using the inverse Mallat transform which needs an amount of calculation much less than that of the conventional numerical integral. Thereby, numerical integrals of frequency component analysis other than the highest frequency component are avoided. A significant reduction in the amount of calculation is thus achieved and the above described first problem is eliminated.

Since the numerical integrals are avoided, it becomes unnecessary to take a large amount of time series data in one processor at a time unlike the Fourier transform. The above described second problem is thus eliminated.

Furthermore, since the inverse Mallat transform used in the present invention is implemented by using a very simple formula, program complexity is also avoided. The above described third problem is thus eliminated.

Furthermore, since the numerical integrals for frequency components other than the highest order can be avoided, the numerical integral needing the largest amount of calculation can be carried out in parallel in all processors in use only once. As a result, the degree of parallelism becomes extremely high. Not only the amount of calculation is reduced, but also the calculation time itself is significantly reduced. Furthermore, the hardware of a computer having parallel calculating mechanisms of distributed memory type can be effectively used.

DESCRIPTION OF THE PREFERRED EMBODIMENTS

Figure 3:
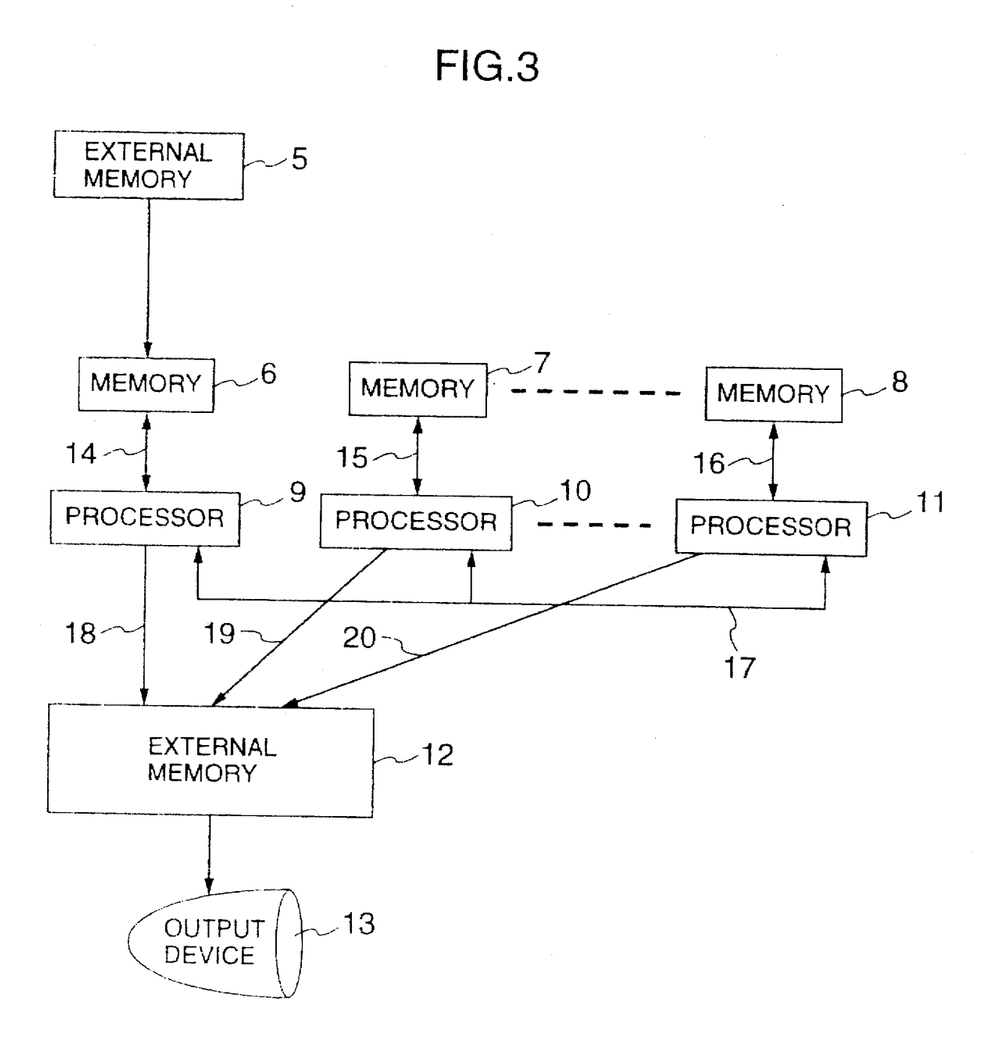
FIG. 3 is a diagram showing an example of configuration of a processing apparatus for achieving implementation of a frequency analyzing method of time series data directed for parallel computers of distributed memory type according to the present invention.

Hereafter, a preferred embodiment of the present invention will be described by referring to FIGS. 3 through 9. FIG. 3 shows an example of a processing apparatus used in the present invention. This processing apparatus includes an external memory 5, memories 6, 7 and 8, processors 9, 10 and 11, an external memory 12, an output device 13, and buses 18, 19 and 20. The external memory 5 stores beforehand large scale time series data, data of the highest order m and the lowest order m0 to be analyzed, data of the Daubechies's progression, and data of the Daubechies's scaling function of the highest order frequency. The memories 6, 7 and 8 are connected via a plurality of buses 14, 15, 16 and 17, and are used to conduct parallel numerical integral processing 2 of the highest order frequency component and series low frequency component analyzing processing 3 using the inverse Mallat transform. The external memory 12 is used to combine frequency data calculated in respective processors. The output device 13 outputs data combined in the external memory 12. The buses 18, 19 and 20 are used to transfer data from the external memory 12 to the output device 13.

Concrete contents of processing conducted by the above described processing apparatus will hereafter be described.

Figure 4:
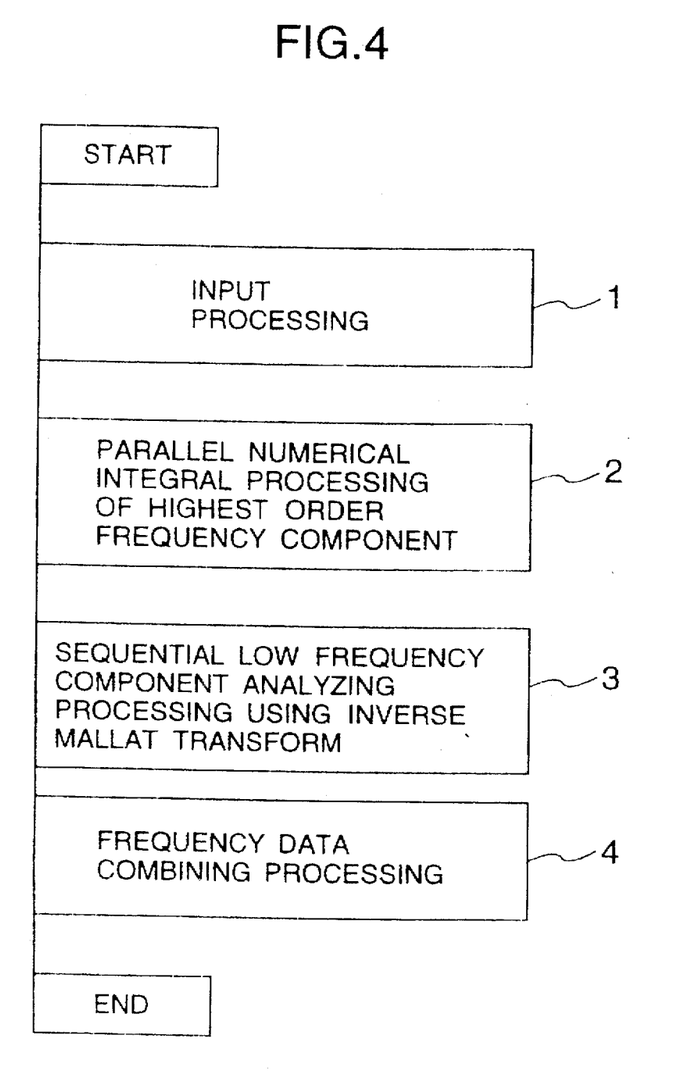
FIG. 4 is a flow chart showing the entire processing procedure of processing contents of a frequency analyzing method of time series data directed for a parallel computer of distributed memory type according to the present invention.

FIG. 4 is a flow chart of the entire processing procedure of the embodiment according to the present invention. The processing includes input processing 1, parallel numerical integral processing 2 of the highest order frequency component, series low frequency component analyzing processing 3 for conducting frequency analysis other than the highest order by using the inverse Mallat transform, and frequency data combining processing 4 for combining all frequency data.

Figure 5:
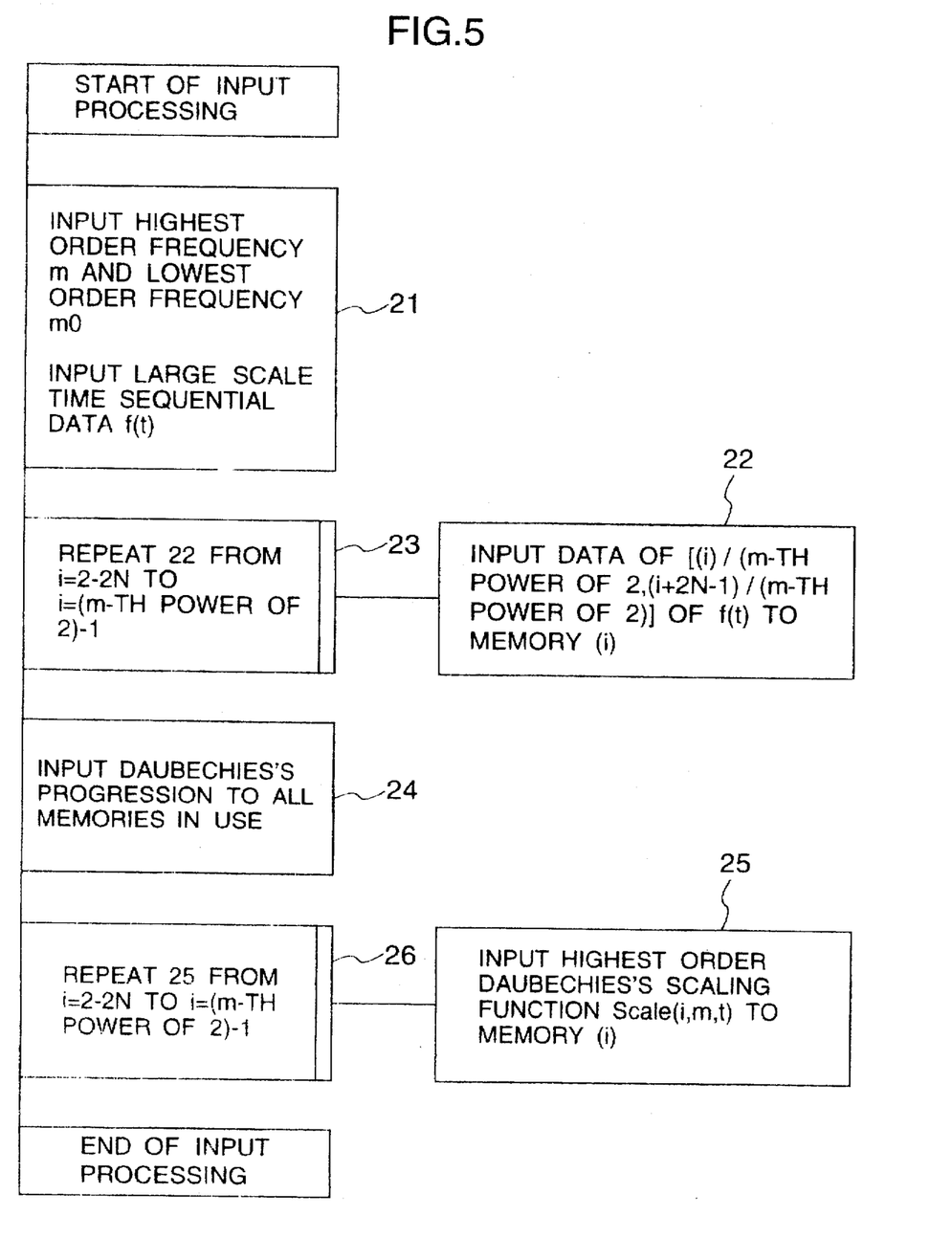
FIG. 5 is a flow chart showing a concrete processing procedure for inputting large scale time series data, a highest order scaling function, and a Daubechies's progression to individual memories of a frequency analyzing apparatus.

By referring to FIG. 5, concrete processing contents of the operation of the input processing 1 will now be described. The large scale time series data and data of the highest order frequency m and the lowest order frequency m0 are inputted from the external memory 5 to the memory 6 (block 21). First data of the large scale time series data is used as f(0). Last data is used as f(1). Remaining data are uniformly assigned in an interval [0,1] to form a piecewise linear function f(t). Hereafter, it is assumed that the function f(t) is adopted as the large scale time series data f(t). Then f(t) is transferred to the processor 9 via the bus 14. The f(t) is divided by the processor 9. Resultant portions are transferred to the memories 7, . . . , 8 via the bus 17, processors 10, . . . , 11, and the buses 15, . . . , 16. To be concrete, a portion of the large scale time series data f(t) existing in a section [(i)/(the m-th power of 2), (i+2N–1)/(the m-th power of 2)] is cut out and inputted to a memory (i) (block 22). This operation is repeated from i=2–2N to i=(the m-th power of 2)–1 (block 23). If the above described portion of the section [(i)/(the m-th power of 2), (i+2N–1)/(the m-th power of 2)] has dropped out of the section [0,1], the value of f(t) is regarded as 0. It is now assumed that the memory (i) ranges from i=2–2N to i=(the m-th power of 2)–1. Subsequently, the Daubechies's progression and the Daubechies's scaling function of the highest order "j=m" to be analyzed having a structure order N located on the external memory are inputted to the memory 6 and transferred to the memories 7, . . . , 8 via the buses 14 and 17 and the buses 15, . . . , 16. To be concrete, the Daubechies's progression (h(0), h(1), . . . , h(2N–1)) is inputted to the memory 6, and transferred to the memories 7, . . . , 8 via the buses 14 and 17 and the buses 15, . . . , 16 (block 24). The Daubechies's scaling function Scale(i,m,t) having a structure order N is inputted to the memory 6 and transferred to the memory (i) via the buses 14 and 17 and the buses 15, . . . , 16 (block 25). This operation is repeated from i=2–2N to i=(m-th power of 2)–1 (block 26).

Figure 6:
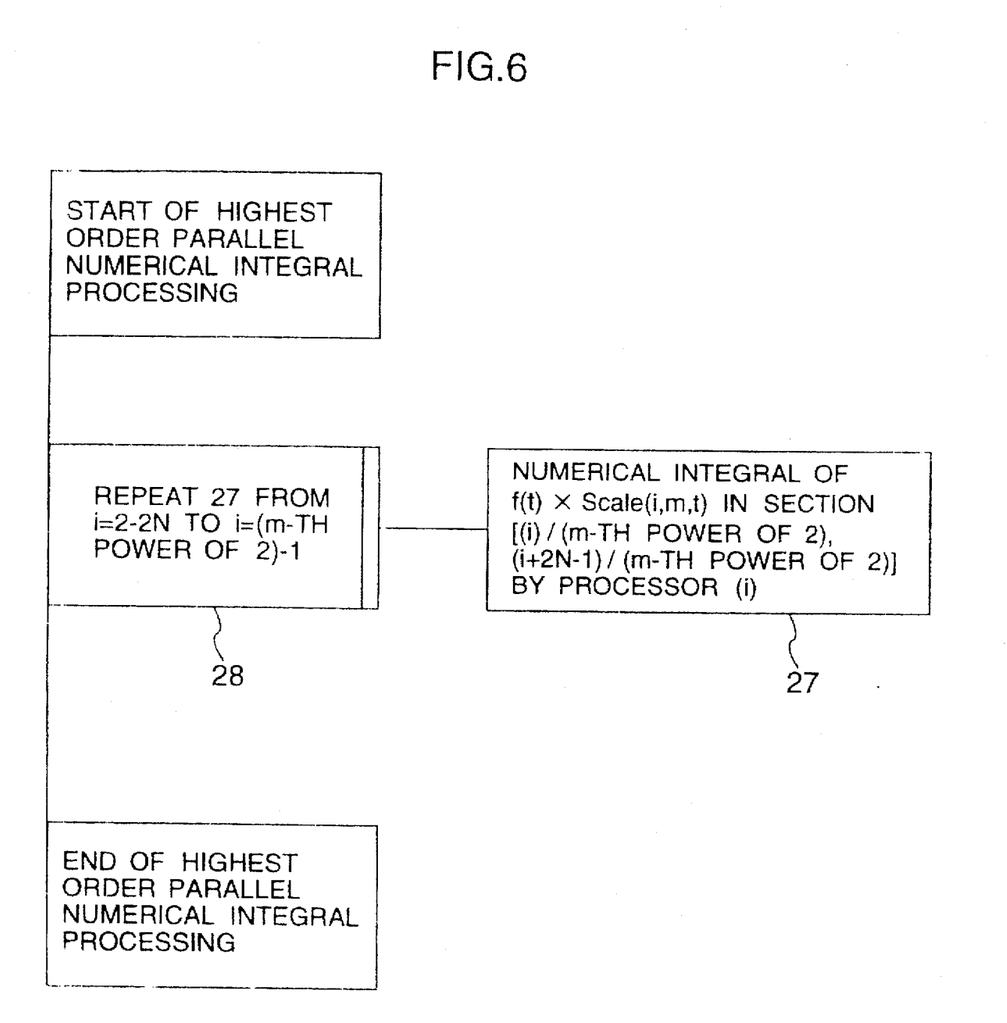
FIG. 6 is a flow chart showing a concrete processing procedure of parallel numerical integral of the highest order frequency component carried out in parallel by individual processors of a frequency analyzing apparatus.

Subsequently, concrete contents of parallel numerical integral processing 2 of the highest order frequency component will now be described by referring to FIG. 6. With respect to data inputted to the memories 6, 7, . . . , 8, the processors 9, 10, . . . , 11 conducts parallel numerical integral of the highest order frequency analysis via the buses 14, 15, . . . , 16. To be concrete, with respect to the product of the portion of [i/(the m-th power of 2), (i+2N–1)/(the m-th power of 2)] of the large scale time series data f(t) inputted to the memory (i) and the scaling function Scale(i,m,t) of the highest order frequency inputted to the same memory (i), the processor (i) conducts numerical integral in the section [i/(the m-th power of 2), (i+2N–1)/(the m-th power of 2)]. The numerical integral is defined as A(i,m) (block 27). This operation is repeated from i=2–2N to i=(the m-th power of 2)–1 (block 28). The integral conducted in the processor (i) is expressed by equation (10).

$$A(i,m) = \int_{\frac{i}{2^m}}^{\frac{i+2N-1}{2^m}} f(t) \text{scale}(i,m,t) dt \quad (10)$$

This numerical integral is conducted in all processors. By this operation, frequency analysis of the highest order (j=(the m-th power of 2)) is carried out in all processors in use in parallel.

Figure 7:
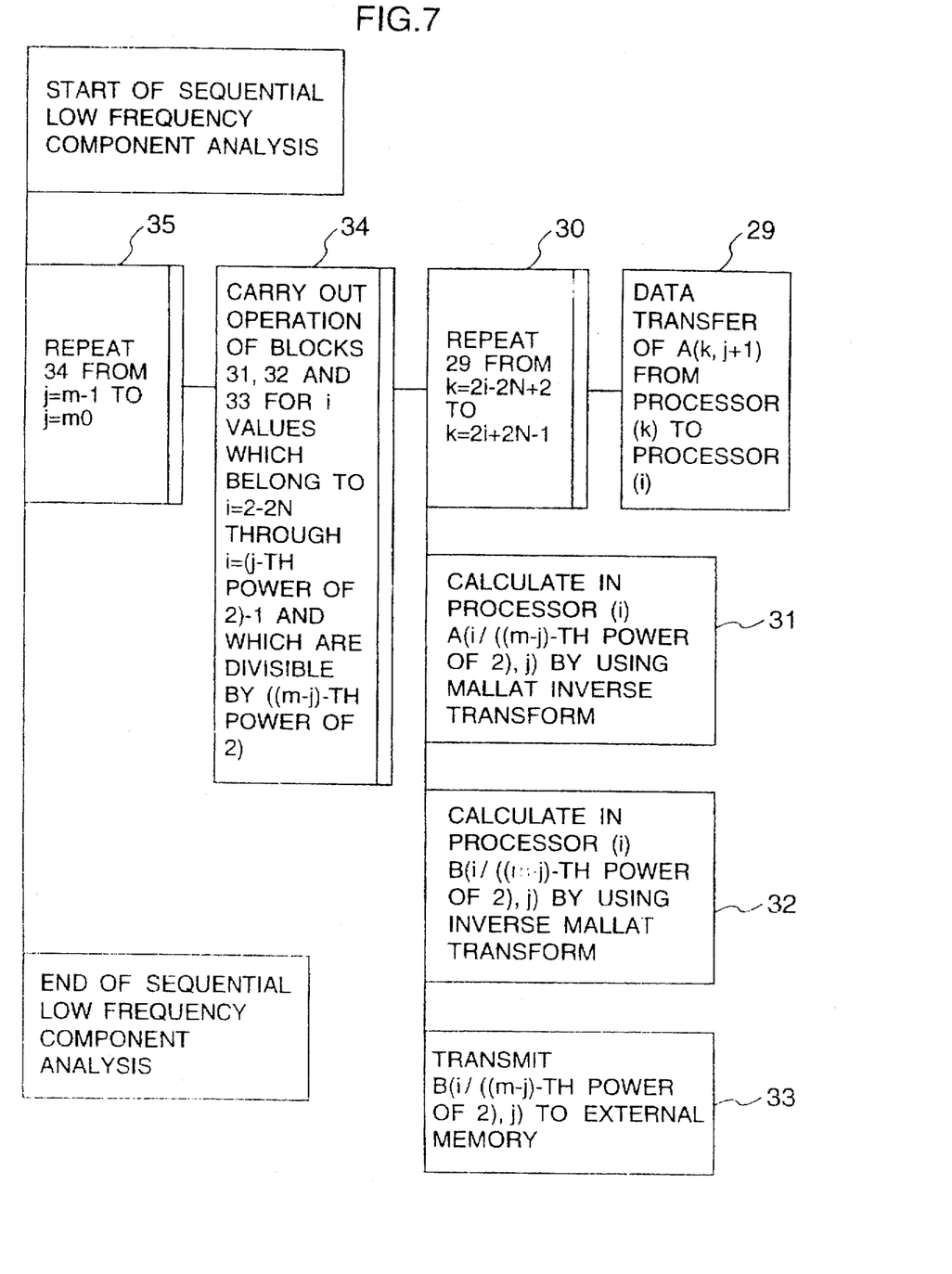
FIG. 7 is a flow chart showing a concrete processing procedure of sequential analysis of a low frequency portion using the inverse Mallat transform which is conducted by a processor of a frequency analyzing apparatus to conduct frequency analysis processing while conducting communication.

By referring to FIG. 7, concrete processing contents of the series low frequency component analyzing processing 3 using the inverse Mallat transform will now be described. By using the inverse Mallat transform (equations (8) and (9)) in the theory of the wavelets and by using frequency data already calculated which is higher by one in order, the low frequency portion is successively derived while receiving data communication from other processors via the bus 17. To be concrete, data transfer of A(k, j+1) from a processor (k) to the processor (i) is conducted via the bus 17 (block 29). This operation is repeated from k=2i–2N+2 to k=2i+2N–1 (block 30). In the processor (i), calculation of A(i/the (m–j)-th power of 2), j) is conducted by using the inverse Mallat transform (equation (8)) (block 31). In the processor (i), calculation of B(i/(the (m–j)-th power of 2), j) is conducted by using the inverse Mallat transform (equation (9)) (block 32). Data transfer of the B(i/ (the (m−j)-th power of 2), j) to the external memory 12 is conducted (block 33). Operation of blocks 31, 32 and 33 is carried out for i values which belong to i=2−2N through (the j-th power of 2)−1 and which are divisible by (the (m−j)-th power of 2) (block 34). Operation of the block 34 is carried out from j=m−1 to the lowest order m0 (block 35).

The effectiveness of the series low frequency analyzing processing 3 using the inverse Mallat transform will now be illustrated. As indicated in the equations (8) and (9) for the inverse Mallat transform, the amount of calculation therein is much smaller than that in the numerical integral (equation (10)). For example, in the case where n pieces of data included in the large scale time series data are to be subjected to numerical integral using the simplest trapezoidal formula, n−1 additions must be effected. However, the inverse Mallat transform using the equations (8) and (9) can be achieved respectively by only 2N multiplications and N−1 additions (where N is the structure order of the Daubechies's scaling function) irrespective of the data amount n of the large scale time series data f(t). The larger the data amount of the large scale time series data f(t) is, the higher the effectiveness of the inverse Mallat transform becomes.

Further effectiveness of the series low frequency analyzing processing 3 using the inverse Mallat transform will now be described. Since the numerical integral can be avoided in the frequency analysis other than the highest order frequency, the numerical integral requiring the largest amount of calculation is conducted by only the above described parallel numerical integral processing 2 of the highest order frequency component. As characteristic facts of the method according to the present invention, the numerical integral requiring the largest amount of calculation is carried out by using all processors, and equal loads are applied to respective processors, resulting in algorithm implementation with a high degree of parallelism. This fact means that the method of the present invention efficiently uses the hardware of the computer having the parallel calculating mechanisms of distributed memory type as shown in the example of the entire apparatus of FIG. 2.

Figure 8:
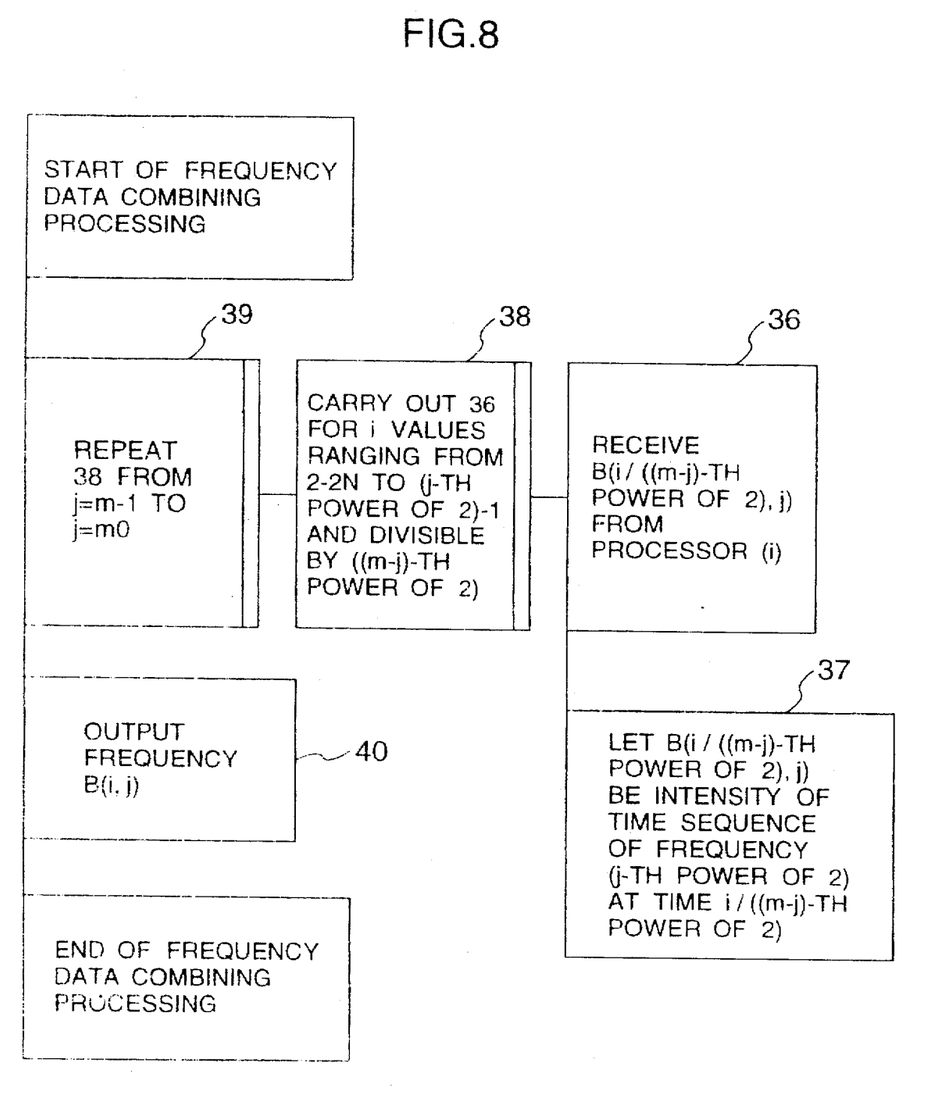
FIG. 8 is a flow chart showing a concrete processing procedure of frequency data combining processing for combining frequency data transferred from individual processors of a frequency analyzing apparatus.

Finally, concrete processing contents of the operation of the frequency data combining processing 4 will now be described by referring to FIG. 8. The frequency data B(i, j) derived by individual processors are transferred to the external memory 12 via buses 18, 19, . . . , 20. In the external memory 12, combining prcessing of the frequency data B(i, j) is conducted. To be concrete, the frequency data B(i/(the (m−j)-th power of 2), j) is received from the processor (i) (block 36). The B(i/(the (m−j)-th power of 2), j) is used as the intensity of the frequency component of the frequency (the j-th power of 2) at time i/the (m−j)-th power of 2 (block 37). The operation of the block 37 is carried out for i values which are in the range from 2−2N to (the j-th power of 2)−1 and which are divisible by (the (m−j)-th power of 2) (block 38). The operation of the block 38 is repeated from j=m−1 to j=m0 of the lowest order frequency (block 39). Data B(i, j) obtained by thus combining is outputted to the output device (block 40).

Figure 9:
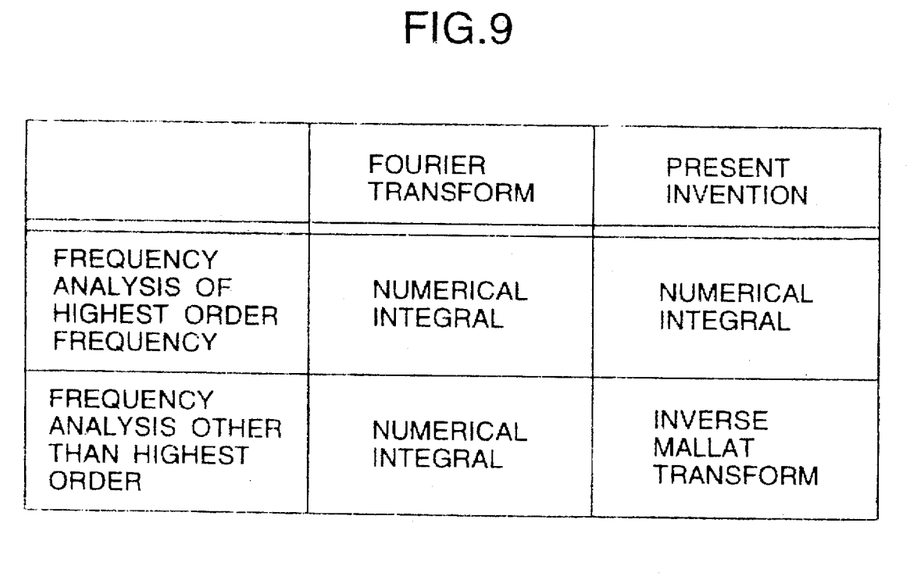
FIG. 9 is a diagram showing a comparison between the Fourier transform method which is the conventional technique and the present invention adopting the inverse Mallat transform of the theory of the wavelet method.

By using, for the frequency analysis other than the highest order frequency, the inverse Mallat transform requiring an extremely smaller amount of calculation than the numerical integral as evident from the comparison shown in FIG. 9, the present invention makes it possible to carry out the frequency analysis of the large scale time series data f(t) at high speed.

We claim:

1. A frequency analyzing method for time series data on a parallel computer of distributed memory type having processors and memories associated with said processors, said frequency analyzing method comprising the steps of:

(a) input processing for inputting, to the memories associated with the processors, a Daubechies's scaling function in the wavelet theory having a resolution of a highest order to be analyzed and time series data divided in a time axis direction so as to have a width of a non-zero section equivalent to that of said scaling function;

(b) parallel numerical integral processing of highest order frequency component for deriving a highest order frequency component of said time series data to be derived in individual processors in parallel by means of numerical integrals by using said scaling function;

(c) series low frequency component analyzing processing using inverse Mallat transform for conducting communication of a frequency component higher in order by one between processors and deriving successively frequency components other than the highest order by using the inverse Mallat transform of the wavelet theory; and (d) frequency data combining processing for transferring frequency components calculated in respective processors to an external memory for an output device, combining the frequency components supplied from said external memory, and outputting a result of combining.

2. A frequency analyzing method for time series data according to claim 1, wherein said inputting processing (1) comprises the steps of:

(a) inputting a highest order frequency m, a lowest order frequency m0, and time series data f(t) from an external memory to the memories associated with the processors;

(b) inputting data of f(t) in a section [(i)/ $2^m$, (i+$_2$N−1)/ 2m] (where N is a natural number) to a memory (i);

(c) repeating the step (b) from i=2−2N to i=$2^m$−1;

(d) inputting a Daubechies's progression to all memories in use;

(e) inputting a Daubechies's scaling function Scale(i,m,t) of the highest order frequency m to the memory (i); and (f) repeating the step (e) from i=2−2N to i=$2^m$−1.

3. A frequency analyzing method for time series data according to claim 1, wherein said numerical integral processing (2) comprises the steps of:

(a) conducting, for a section i/$2^m$, (i+2N−1)/ $2^m$ (where N is a natural integer) in a processor (i), numerical integral on a product of time series data f(t) inputted in the step (1) and a Daubechies's scaling function Scale (i,m,t) having a resolution of a highest order m; and (b) repeating the step (a) from i=2−2N to i=$2^m$−1.

4. A frequency analyzing method for time series data according to claim 1, wherein said analyzing processing step (3) comprises the steps of:

(a) transferring an expansion coefficient A(k, j+1) as data from a processor (k) to a processor (i);

(b) repeating said step (a) from k=2i−2N+2 (where N is a natural number) to k=2i+2N−1;

(c) calculating, in the processor (i), A(i/ $2^{m-j}$, j) and B(i/$2^{m-j}$, j) by using the inverse Mallat transform;

(d) transferring B(i/$2^{m-j}$, j) as data to the external memory;

(e) carrying out the steps (b) through (d) for i values being in the range of i=2−2N to i=$2^j$−1 and being divisible by $2^{(m-j)}$; and (f) repeating said step (e) from j=m−1 to j=m0.

5. A frequency analyzing method for time series data according to claim 1, wherein said combining processing step (4) comprises the steps of:

(a) receiving frequency data B(i/$2^{m-j}$, j) from a processor (i) and using the frequency data B(i/ $2^{m-j}$, j) as strength of time sequence of a frequency ($2^j$);

(b) carrying out said step (a) for i values being in the range of i=2−2N (where N is a natural number) to i=$2^j$−1 and being divisible by $2^{(m-j)}$;

(c) repeating said step (b) from j=m−1 to j=m0; and (d) outputting frequency data B(i, j) obtained by combining to the output device.

6. A frequency analyzing apparatus for time series data on a parallel computer of distributed memory type having processors and memories associated with said processors, said frequency analyzing apparatus comprising:

(1) memory means associated with the processor to store a Daubechies's scaling function in the wavelet theory having a resolution of a highest order to be analyzed and time series data divided in a time axis direction so as to have a width of a non-zero section equivalent to that of said scaling function;

(2) parallel numerical integral means of highest order frequency component for deriving a highest order frequency component of said time series data to be derived in individual processors in parallel by means of numerical integrals by using said scaling function;

(3) series low frequency component analyzing means using inverse Mallat transform for conducting communication of a frequency component higher in order by one between processors and deriving successively frequency components other than the highest order by using the inverse Mallat transform of the wavelet theory; and (4) frequency data combining means for transferring frequency components calculated in respective processors to an external memory for an output device, combining the frequency components in said external memory, and outputting a result of combining.

* * * * *